FLOATING AXLE ATTACHMENT

Original Filed Feb. 19, 1962 5 Sheets-Sheet 1

NORMAN B. CHEW
*INVENTOR.*

*BY*
Flehr and Swain
ATTORNEYS

FLOATING AXLE ATTACHMENT

Original Filed Feb. 19, 1962 5 Sheets-Sheet 2

NORMAN B. CHEW
*INVENTOR.*

BY
Flehr and Swain
ATTORNEYS

FLOATING AXLE ATTACHMENT

Original Filed Feb. 19, 1962 5 Sheets-Sheet 3

NORMAN B. CHEW
*INVENTOR.*

BY
Flehr and Swain
ATTORNEYS

FLOATING AXLE ATTACHMENT

Original Filed Feb. 19, 1962 5 Sheets-Sheet 4

NORMAN B. CHEW
*INVENTOR.*

BY Flehr and Swain
ATTORNEYS

NORMAN B. CHEW
*INVENTOR.*

BY Flehr and Swain
ATTORNEYS

United States Patent Office

Re. 26,303
Reissued Nov. 21, 1967

26,303
FLOATING AXLE ATTACHMENT

Norman B. Chew, Portland, Oreg., assignor to Freightliner Corporation, Portland, Oreg., a corporation of Delaware Original No. 3,203,711, dated Aug. 31, 1965, Ser. No. 173,996, Feb. 19, 1962. Application for reissue May 5, 1967, Ser. No. 642,249

10 Claims. (Cl. 280—415)

Matter enclosed in heavy brackets [ ] appears in the original patent but forms no part of this reissue specification; matter printed in italics indicates the additions made by reissue.

*ABSTRACT OF THE DISCLOSURE*

*A floating axle attachment mountable on a wheeled structure between the wheels thereof for load distribution.*

This invention relates generally to a floating axle attachment and more particularly to a floating axle attachment for load distribution suitable for use also as a four to six wheel converter.

There have been many types of converters for effectively converting a four-wheel tractor to a six-wheel tractor. Converters, in general, carry a portion of the load to provide an improved load distribution between the sets of wheels so that no set exceeds the maximum permitted by the load laws of most states.

In general, prior converters include a framework which carries a second fifth wheel for receiving the trailer and a king pin for attaching the tandem trailer to the tractor fifth wheel. The second fifth wheel adds height to the overall combination. In many instances, this leads to excessive overall height when a semi-trailer is attached. There have been several attempts to reduce the height of converters. For example, the converter fifth wheel has been lowered by insetting it into the converter frame.

The load distribution in prior converters is fixed by the relative location of the tractor and converter fifth wheels. The load distribution, in general, is not maintained as the equipment is operated over rough or irregular roads or terrain.

Attachments have also been suggested for mounting an extra axle on a trailer whereby to control the load distribution. However, such attachments do not provide for maintaining the load distribution when the trailer is operated over rough or irregular roads or terrain.

It is a general object of the present invention to provide a floating axle attachment.

It is another object of the present invention to provide a floating axle attachment which will carry a substantially constant load regardless of road or terrain irregularities.

It is another object of the present invention to provide a floating axle attachment having its axle supported from a frame with substantially zero spring rate spring means whereby the load on the axle remains substantially constant with changing axle position relative to the frame.

It is still another object of the present invention to provide a floating axle attachment which does not appreciably add to the overall height of the tractor semi-trailer combination.

It is another object of the present invention to provide a three pin connection for attaching a floating axle to a frame.

It is another object of the present invention to provide a floating axle attachment which is suitable for controlling for and aft and side weight distribution.

It is still a further object of the present invention to provide a floating axle attachment which can be employed to control the effective load center of a tractor and semi-trailer combination.

It is a further object of the present invention to provide an axle which is supported from a frame by constant spring rate pneumatic springs and which includes a three pin connection for guiding the axle and absorbing torque loads.

These and other objects of the invention will become more clearly apparent from the following description taken in conjunction with the accompanying drawing.

Referring to the drawing.

Figure 1:
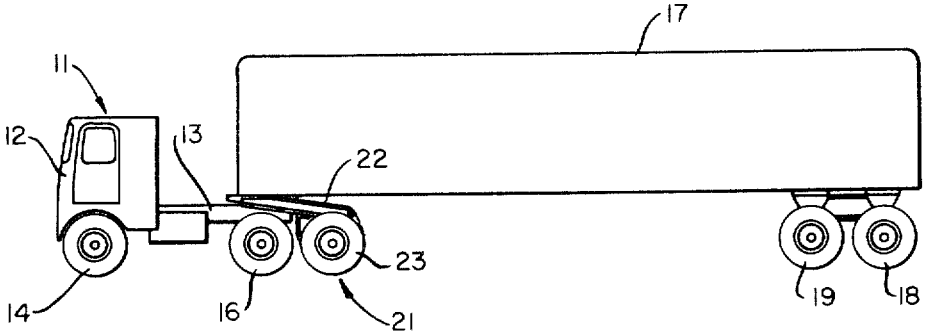
FIGURE 1 is a side elevational view of a tractor and semi-trailer including a floating axle attachment or dolly.

Referring to FIGURE 1, there is schematically shown a tractor 11 including a cab 12 carried on tractor frame 13. Front wheels 14 and rear wheels 16 are mounted to the tractor frame 13. A semi-trailer 17 having tandem rear wheels 18 and 19 is shown attached to the tractor 11 by a floating axle attachment designated generally by the numeral 21. The attachment is interposed between the semi-trailer 17 and the tractor 11. The attachment 21 includes a frame 22 and wheels 23 carried by a floating axle. *The semi-trailer is of conventional form and thus has a frame at the lower portion of the body thereof and this frame is supported in stable relation to the terrain by its own pairs of wheels 18 and 19 disposed at its rear end, and at its front end by wheels 16.*

Figure 2:
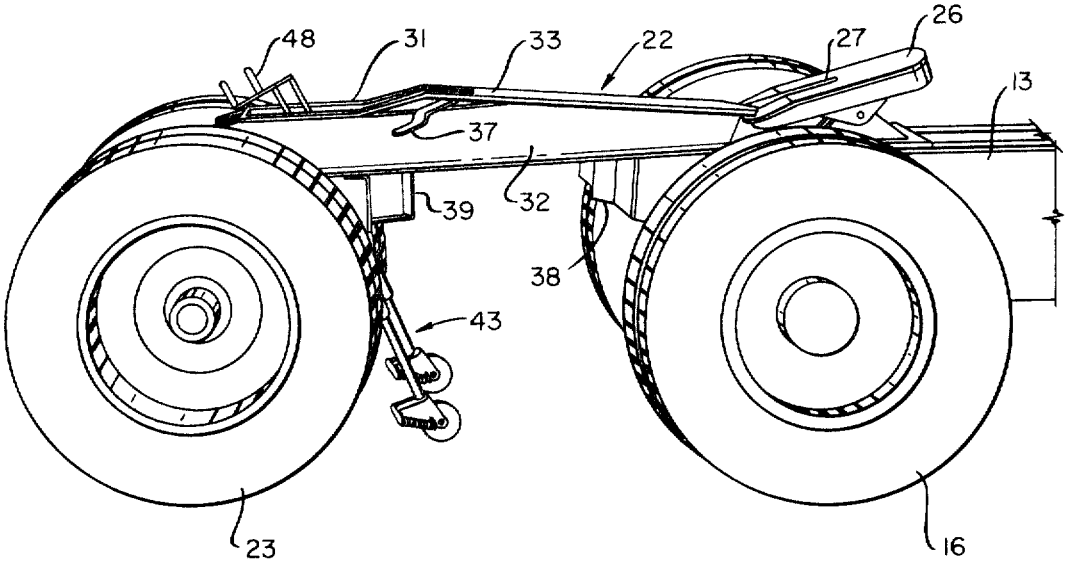
FIGURE 2 is an enlarged side elevational view showing the floating axle attachment or dolly before coupling to the fifth wheel of a tractor.

Referring more specifically to FIGURE 2, the tractor frame 13 carries a fifth wheel 26 which is pivotally mounted to the frame and includes opening 27 adapted to receive the king pin of an associated semi-trailer or floating axle attachment, hereinafter referred to as attachment. The frame 22 of the attachment includes spaced channels 31 and 32, FIGURES 4 and 5, which serve to support a coupling plate 33. The forward end of the coupling plate carries a coupling pin 34 (FIGURE 4) which is received in the opening 27 of the tractor fifth wheel for coupling the attachment to the tractor. A conventional locking mechanism is employed on the fifth wheel for locking the attachment thereto.

Spaced guide members 38 are provided at the rear of the tractor frame as, for example, by attachment to the cross member. The guide members 38 cooperate with the spaced guides 39 mounted on the attachment to the cross member 41 secured to the spaced channels 31 and 32. The guide members serve to limit, in the horizontal plane, the turning movement of the attachment with respect to the tractor.

Figure 3:
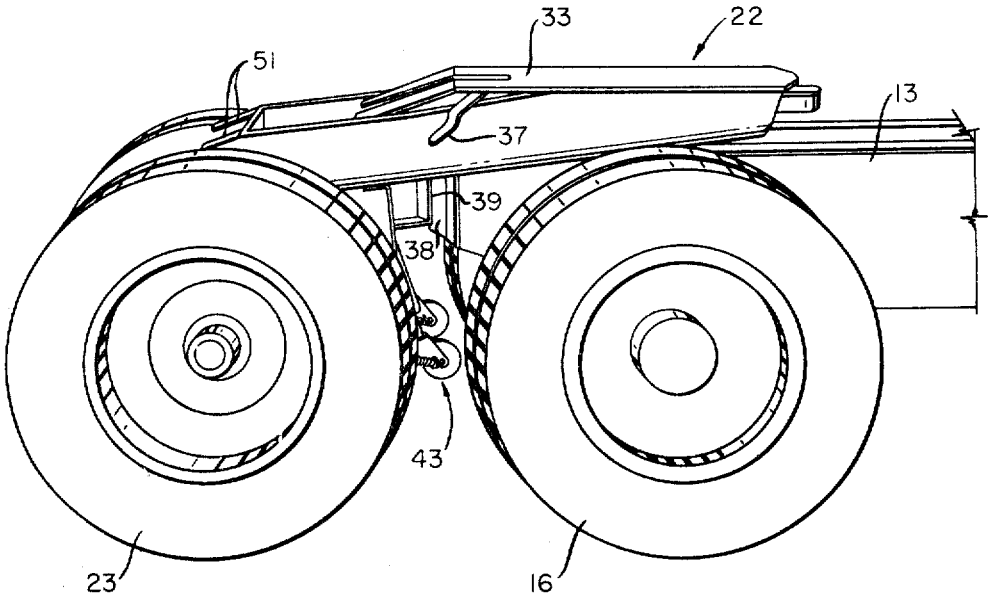
FIGURE 3 is an enlarged side elevational view of the combination shown in FIGURE 2 with the floating axle attachment or dolly coupled to the tractor fifth wheel.

Retractable telescoping spaced supports 43 are provided for supporting the attachment when it is detached from an associated tractor. The retractable supports each include an outer sleeve 44, FIGURE 4, which slidably accommodates the leg or shaft 46 which carries spring loaded wheels 47. The other ends of the shafts 46 are driven by means of a conventional mechanism (not shown). The drive means may comprise screws which are turned by the handles 48 (FIGURES 2 and 4) and are pivotally connected to a drive shaft 49 whereby the activating cranks 48 may be folded downwardly out of the way as shown in FIGURES 5 and 6. Referring to FIGURE 3, the supports 43 are shown in retracted position.

The plate 33 includes a rearwardly extending slot which has a V-shaped opening and which terminates in a narrow rounded slot which receives the king pin of a semi-trailer. Conventional locking means are provided for locking the king pin to the plate. Such means may comprise a locking means 36, FIGURE 4, with an associated lever arm 37 extending from the side of the attachment.

The rear of the plate 33 is inclined downwardly to guide the trailer onto the attachment. Suitable spaced guides 51 may be provided at the rear of the channel for further guiding the semi-trailer onto the attachment.

It is to be observed that once the semi-trailer is coupled to the attachment, the upper surface of the plate 33 is in intimate contact with the cooperating lower surface of the semi-trailer. Only turning movement between the attachment and semi-trailer is provided. This feature, as will be presently described, permits the effective load center to be at a location other than at the king pin connection of the semi-trailer to the attachment.

Figure 4:
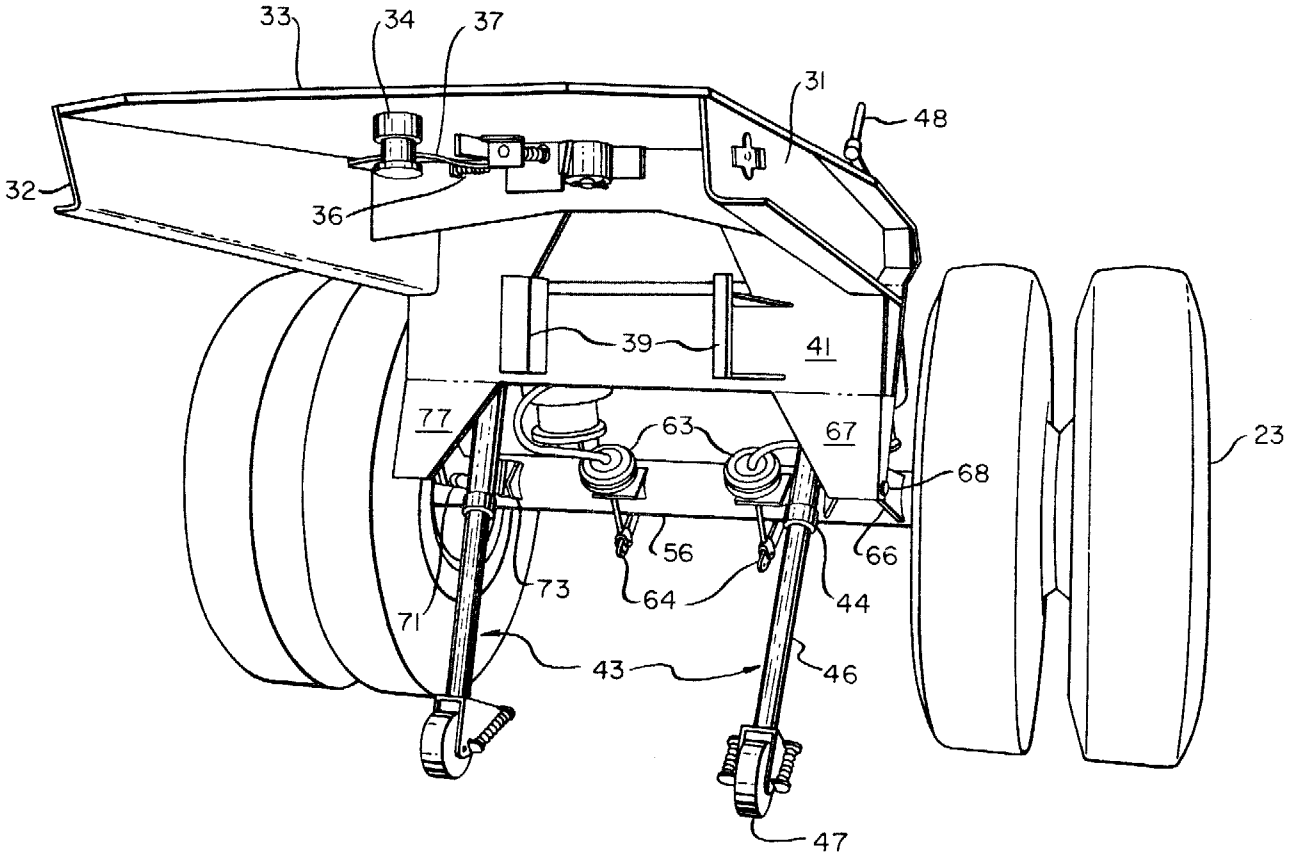
FIGURE 4 is a perspective view of a floating axle attachment as viewed from the front.
Figure 5:
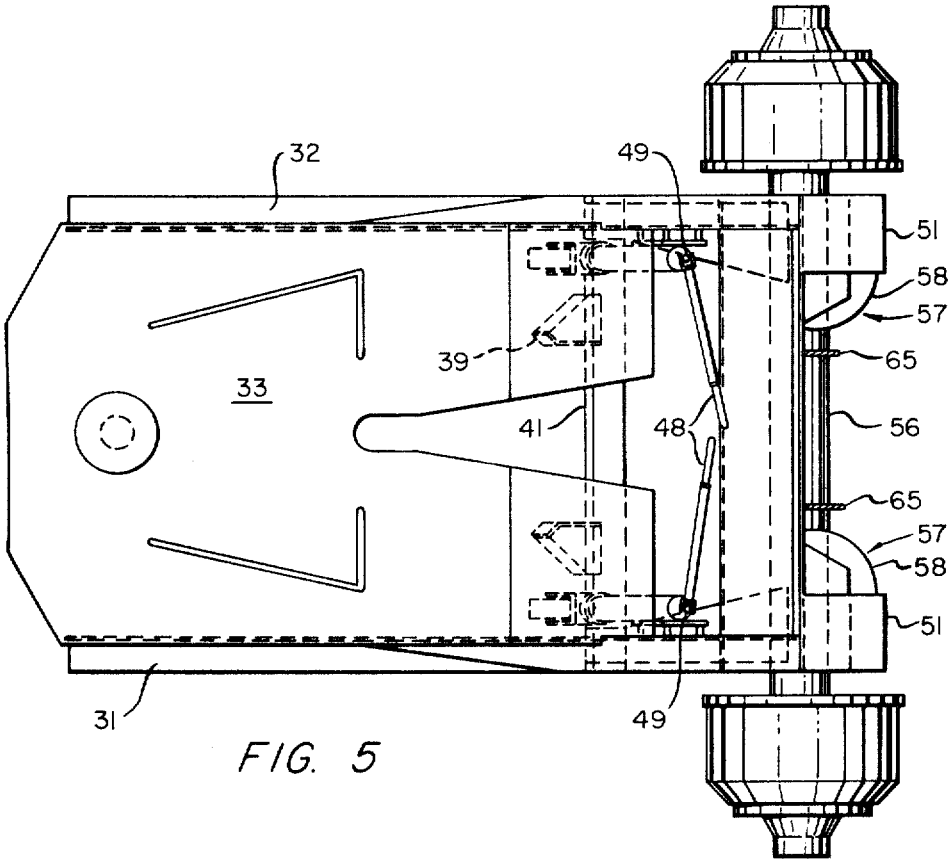
FIGURE 5 is a plan view of a floating axle attachment in accordance with the invention.
Figure 6:
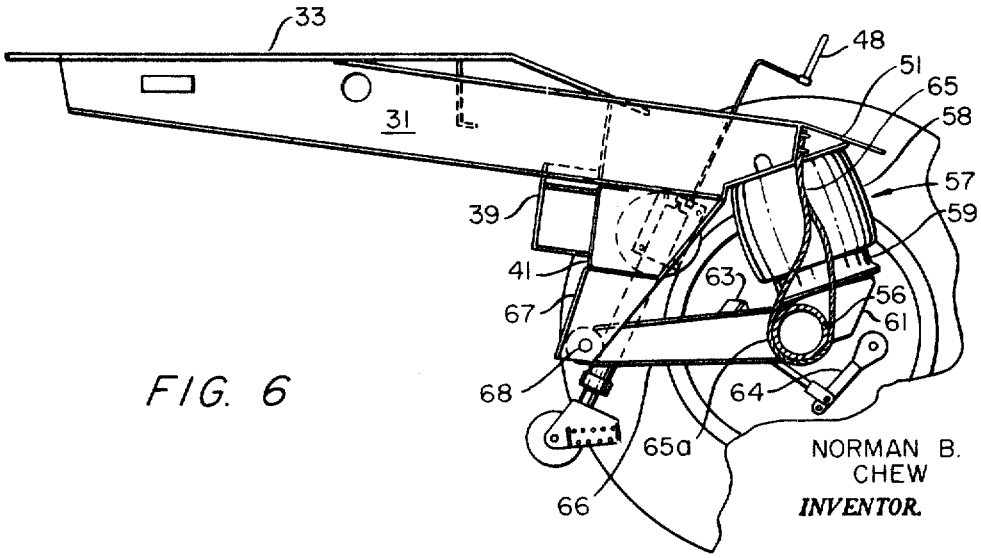
FIGURE 6 is a side elevational view, partly in section, of the floating axle attachment shown in FIGURE 5.

The wheels 23 are supported on a floating axle 56, FIGURES 4, 5 and 6. The floating axle is maintained in spaced relationship with respect to the attachment frame by means of air or pneumatic springs 57 which include a bag 58 suitably attached to the frame and a piston-like member 59 attached to a bracket 61. The bracket 61 is suitably secured to the axle as, for example, by welding. Brake cylinders 63 which activate brake levers 64 are also mounted on the axle. Cables 65 are attached at their ends to the attachment frame with the loop 65*a* encircling the axle 56 to limit the movement of the axle with respect to the frame.

The axle, in effect, floats on the air springs. Means are provided for adjusting the track of the axle with respect to the tractor and for absorbing torque loads. Such means comprises a forwardly extending torque arm 66 which is welded near one end of the axle and is pivotally received by the torque bracket 67 attached to and extending downwardly from the cross member 41. The bracket 67 carries a pin 68 which pivotally receives the arm 66. Disposed at the other end of the axle is an adjustable radius rod 71 which is pivotally received by spaced brackets 72 and 73. One bracket is attached to the axle as, for example, by welding. The other bracket is attached to cross member 41 through a bracket 77. The radius rod 71 is adjustable in length whereby proper tracking of the floating axle attachment wheels can be obtained. A three pin axle attachment of this type is simple in construction and yet can take care of brake torque and side loads, while the adjustable free link takes off fore and aft loading and prevents side bending loads in the fixed arm. This adjustable link provides the additional feature of adjusting the track of the vehicle with respect to the towing vehicle thereby reducing tire wear due to misalignment. It is apparent, however, that the link or radius rod 71 may be of fixed length and still take fore and aft loading and prevent side bending.

Figure 9:
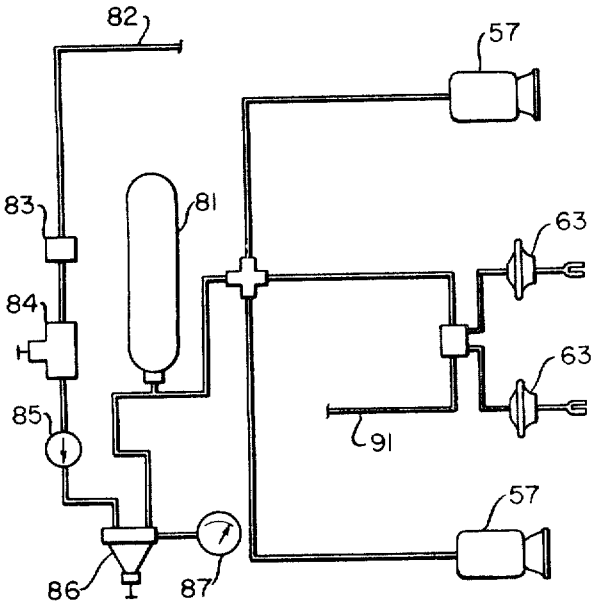
FIGURE 9 shows the air supply for the brakes and the pneumatic springs of the floating axle attachment.
Figure 7:
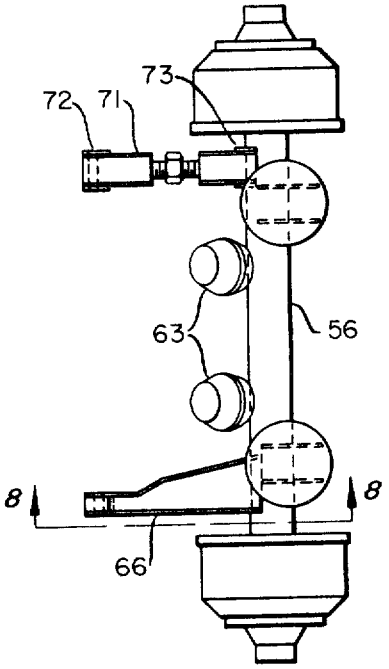
FIGURE 7 is a plan view showing the three pin connection of the axle to the frame.

A pneumatic system is schematically illustrated in FIGURE 9. Compressed air is supplied to the tank 81 through an air line 82. The air line 82 is connected to the tank 81 through strainer 83, protective valve 84, check valve 85 and pressure regulator 86. The pressure regulator 86 includes a pressure gauge 87 for indicating pressure. The gauge may be calibrated to read directly weight carried by the associated wheels. The tank 81 is connected to the spaced air spring bags 57. The amount of force developed by the spring 57 is adjusted by adjusting the pressure regulator 86 to control the pressure. It is observed that as the bags 57 are compressed and expanded due to movement of the axle, the force will remain substantially constant because of the constant pressure in the system. Thus, the pneumatic springs have essentially zero spring rate, i.e., there is no change in force as a result of the deflection. In the example, this is achieved by the pressure regulator. However, if the ratio of volumes between the tank 81 and the air bags 57 is sufficiently large, that is, the volume of the tank is many times larger than the volume of the air bags, then the pressure will remain substantially constant even though there is no pressure regulating means available.

Figure 11:
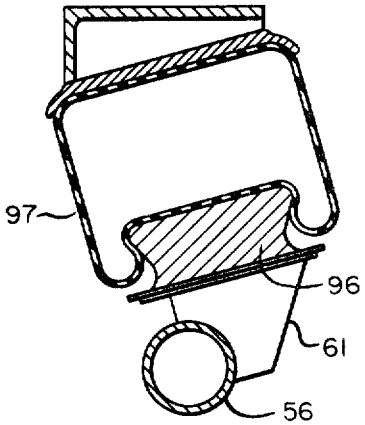
FIGURE 11 shows a modified pneumatic spring.

Referring to FIGURE 11, another method of achieving a substantially zero spring rate is illustrated. This includes a pneumatic spring having a piston 96 with a configuration such that as the piston penetrates more deeply, the effective area decreases. The volume of the air spring will also decrease thereby increasing pressure within the air spring. The decreasing area of the piston is proportioned with respect to the decreasing volume of the system (i.e., increasing pressure) whereby the force is held essentially constant for the relatively small and rapid changes such as will be incurred by axle movement during travel over rough roads. Thus, the load distribution between the tractor wheels, trailer wheels, and attachment wheels will remain essentially constant. It has been observed that this results in a more nearly constant force than obtained solely from a commercial pressure regulator since conventional pressure regulators customarily allow a slight rise of pressure before bleeding off air, and conversely, a slight reduction in pressure before adding air.

As previously described, there is intimate coupling between the semi-trailer and the plate 33 of the attachment, while still allowing for turning movement. If the pressure is increased in the air bag 57, there will be a tendency to lift the rear of the trailer with the pivot point being the pivot of the tractor fifth wheel. The effective load center is shifted forward with respect to the pin connection at the plate 33. The load at the rear wheels will be reduced while the load on the floating axle wheels 23 and the wheels of the tractor will be increased.

The diagram of FIGURE 9 also shows a brake line 91 serving to control the spaced brake cylinders 63 by driver actuation of a suitable valve 92, such as a pilot operated valve of conventional design, which serves to apply working pressure to the brake cylinders. It is observed that by supplying the air brakes from the same supply, the pressure applied to the brakes is proportional to the load carried by the associated wheels. This gives effective braking action.

Figure 10:
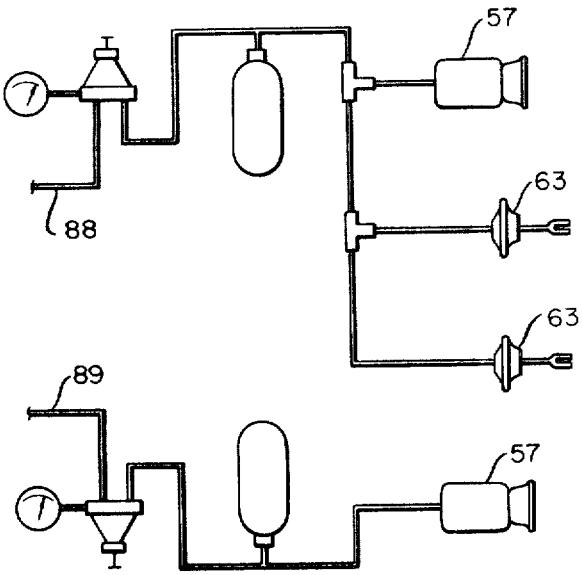
FIGURE 10 shows a modified air supply for the brakes and pneumatic springs of the floating axle attachment.
Figure 8:
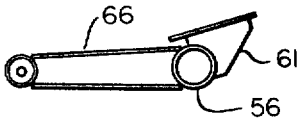
FIGURE 8 is a side elevation of FIGURE 7.

Referring to FIGURE 10, there is shown a pneumatic system in which the air spring bags 57 are supplied from individual supplies 88 and 89. This permits application of different pressure to the air springs whereby the lateral load distribution can be controlled.

Figure 12:
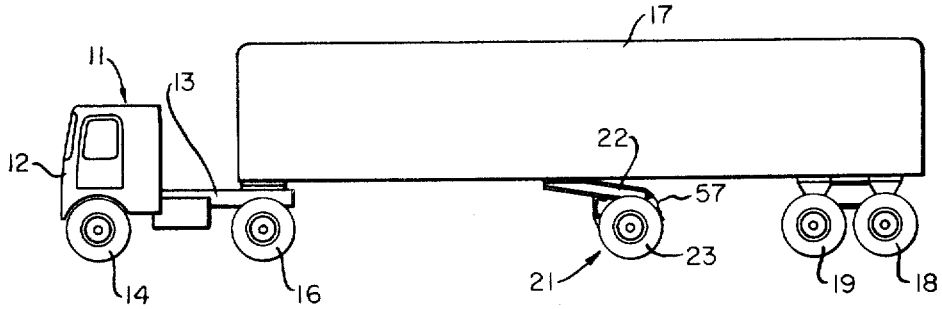
FIGURE 12 shows a floating axle attachment in accordance with the present invention carried by a trailer body for load distribution.

The attachment may be constructed so that it can be secured to the center of the semi-trailer body as shown in FIGURE 12. By controlling the spring rate of the pneumatic spring 57, the weight distribution between the rear wheels of the semi-trailer and the tractor wheels can be controlled.

It is seen that by providing a floating axle which works against springs having a zero spring rate, the load that the wheels associated therewith carry remains constant even though the wheels and axle move essentially due to uneven or irregular roads or terrain. The system described employing pneumatic springs provides the further advantage that the load distribution can be controlled by controlling the pressure applied thereto.

I claim:

1. Apparatus for carrying a load over terrain comprising a frame adapted to carry the load, first and second pairs of ground engaging wheels supporting the frame in stable relation to the terrain at each end of the frame, a load distribution attachment disposed between the pairs of ground engaging wheels to distribute the load therebetween, said attachment comprising a frame, an axle, a pair of ground engaging wheels carried by said axle, resilient means having substantially zero spring rate interposed between the axle and the last named frame to support the load in varying spaced relation with respect to the axle with substantially constant force applied by said resilient means whereby load distribution between the first and second pairs of wheels is maintained constant.

2. Apparatus for carrying a load over terrain comprising a tractor vehicle having ground engaging wheels, a semi-trailer vehicle having ground engaging wheels, means coupling the semi-trailer to the tractor including a fifth wheel carried by said tractor, and a load distribution attachment disposed between the first and second named ground engaging wheels to distribute the load therebetween, said attachment comprising a frame, an axle, ground engaging wheels on said axle, and resilient means having substantially zero spring rate interposed between the axle and frame for supporting the frame in varying spaced relation with respect to the axle free of variations in the supporting force supplied.

3. A tandem trailer adapted to be attached to the fifth wheel of a tractor and serving to receive the king pin of a semi-trailer comprising a single relatively thin support plate serving to carry a pin for attachment to the fifth wheel of the tractor and a socket in said plate for receiving the pin of the semi-trailer, frame means for supporting said plate, an axle, resilient means having a substantially zero spring rate interposed between the axle and frame and serving to apply a substantially constant supporting force to said plate, and means attached to said axle for absorbing brake torque and side loads.

4. A tandem trailer comprising a frame, said frame including first and second spaced longitudinal members and a single relatively thin plate supported by said members, a pin carried at one end of said plate, said plate being formed to receive the king pin of a semi-trailer, means adapted to lock the king pin to said plate, an axle, ground engaging wheels carried on the ends of the axle, resilient means interposed between the axle and frame and serving to support the frame in varying spaced relationship with respect to the axle.

*5. An apparatus as set forth in claim 1, wherein the attachment is located next to one pair of the ground engaging wheels which support the first named frame, and wherein part of the frame of the attachment is interposed between the first named frame and said one pair of ground engaging wheels.*

*6. An apparatus as set forth in claim 1, wherein there are connecting means establishing a supporting connection between the first named frame and said first and second pairs of ground engaging wheels, and wherein the frame of the attachment is connected to the first named frame at a place spaced from said connecting means.*

*7. Apparatus for carrying a load over terrain comprising a frame adapted to carry the load, first and second pairs of ground engaging wheels supporting the frame in stable relation to the terrain at each end of the frame, a load distribution attachment having a pair of ground engaging wheels disposed between said pairs of ground engaging wheels to distribute the load therebetween, said attachment comprising a frame, an axle on which the ground engaging wheels of the attachment are carried, resilient means having substantially zero spring rate interposed between the axle and the last named frame to support the load in varying spaced relation with respect to the axle with substantially constant force applied by said resilient means whereby load distribution between the first and second pairs of wheels is maintained constant.*

*8. An apparatus as set forth in claim 2 wherein the frame of the attachment comprises part of the means coupling the semi-trailer vehicle to the tractor vehicle.*

*9. An apparatus as in claim 2 wherein the frame of the attachment is connected to the semi-trailer vehicle in remote relation to the means which couple the semi-trailer to the tractor.*

*10. An apparatus for carrying a load over terrain comprising a semi-trailer vehicle having rear ground engaging wheels, a tractor vehicle having rearwardly located ground engaging wheels disposed in supporting relation to the front of the semi-trailer, a load distributing attachment comprising a frame, an axle, ground engaging wheels on said axle, and resilient means having substantially zero spring rate interposed between the axle and frame of the attachment for supporting such frame in varying spaced relation with respect to the axle free of variations in the supporting force supplied, the attachment being disposed in supporting relation to the semi-trailer vehicle at a place with its ground engaging wheels located between the rear wheels of the tractor vehicle and the rear wheels of the semi-trailer to distribute the load therebetween.*

References Cited

The following references, cited by the Examiner, are of record in the patented file of this patent or the original patent.

UNITED STATES PATENTS

| | | | |
|---|---|---|---|
| 820,707 | 5/1906 | Downer. | |
| 1,039,537 | 9/1912 | Hofmann | 267—65 |
| 2,816,776 | 12/1957 | Nimtz | 267—66 |
| 2,859,046 | 11/1958 | Easton | 280—124 |
| 2,882,042 | 4/1959 | Fleckenstein | 267—34 |
| 2,893,520 | 7/1959 | Rockwell | 303—22 |
| 2,917,319 | 12/1959 | Axtmann | 267—65 |
| 2,941,816 | 6/1960 | Benson | 267—65 |
| 3,018,139 | 1/1962 | Stelzer | 303—22 |
| 3,022,087 | 2/1962 | Black | 267—65 X |
| 3,043,582 | 7/1962 | Hirtreiter | 267—65 |
| 3,078,085 | 2/1963 | Bank | 267—65 |

LEO FRIAGLIA, *Primary Examiner.*